United States Patent [19]

Pizzola

[11] 4,411,569

[45] Oct. 25, 1983

[54] APPARATUS FOR BROACHING RIFLING

[75] Inventor: Robert M. Pizzola, Stroudsburg, Pa.

[73] Assignee: The United States of America as represented by the Secretary of the Army, Washington, D.C.

[21] Appl. No.: 276,410

[22] Filed: Jun. 22, 1981

[51] Int. Cl.³ ............................................ B23D 37/16
[52] U.S. Cl. .................................. 409/261; 409/306
[58] Field of Search ............... 409/260, 261, 259, 305, 409/306, 307; 29/1.1, 1.11

[56] References Cited

U.S. PATENT DOCUMENTS

| | | | |
|---|---|---|---|
| 1,310,934 | 7/1919 | Suverkrop et al. | 409/261 X |
| 1,324,289 | 12/1919 | Andrews | 409/306 X |
| 1,910,118 | 5/1933 | McCune | 409/306 |
| 2,158,720 | 5/1939 | Hart | 409/260 X |
| 2,315,476 | 3/1943 | Grovene | 409/261 |
| 2,317,514 | 4/1943 | Bonnafe | 409/261 X |

*Primary Examiner*—William R. Briggs
*Attorney, Agent, or Firm*—Robert P. Gibson; Anthony T. Lane; Max Yarmovsky

[57] ABSTRACT

A method for broaching a gain twist rifling in a gun barrel comprises cutting the initial tracking groove in the gun barrel, and thereafter passing a plurality of freely rotatable cutter assemblies disposed in spaced apart communication with each other, so that the cutters projecting from each cutter assembly pass sequentially through and may freely rotate within the tracking groove to successively increase and refine the diameter to form the final rifling grooves.

The apparatus comprises a plurality of cutter assemblies mounted in spaced apart position along a support and drive shaft. The cutter assemblies define radially extending cutters, and are arranged in the order of increasing radial extension of the cutters, so that the radialmost extending cutter assembly makes the final pass through the tracking groove to complete the broaching operation. The cutter assemblies are preferably adapted to remain non-rotatable along the shaft until they engage the tracking groove, and the apparatus includes an indexing assembly that aligns the cutters with the tracking groove. The present invention eliminates the need for repeated cutting passes to achieve a uniform gain twist in the rifling grooves.

6 Claims, 6 Drawing Figures

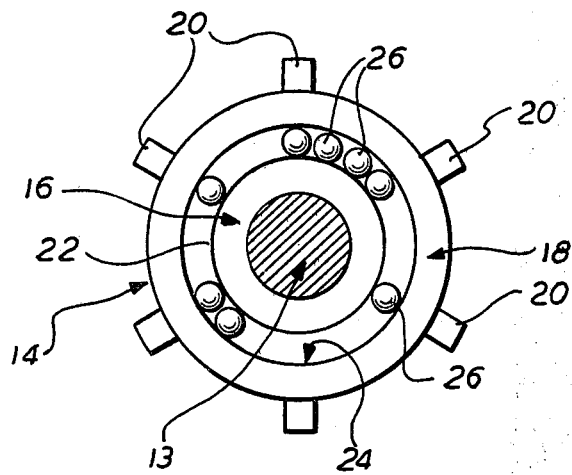
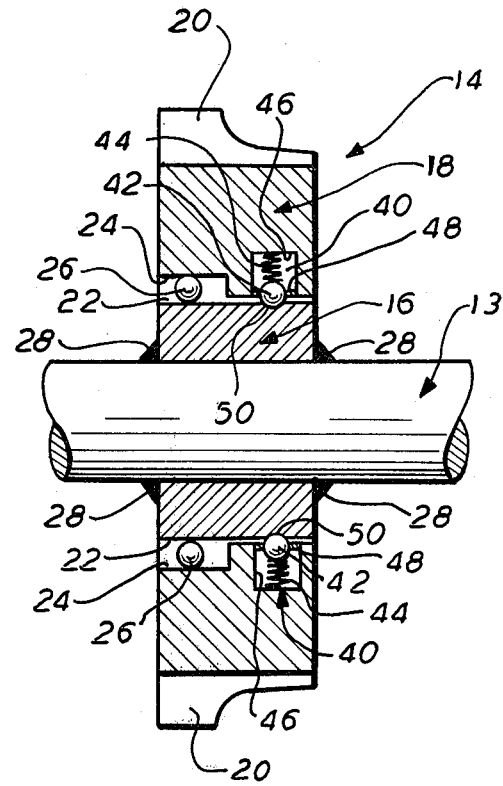
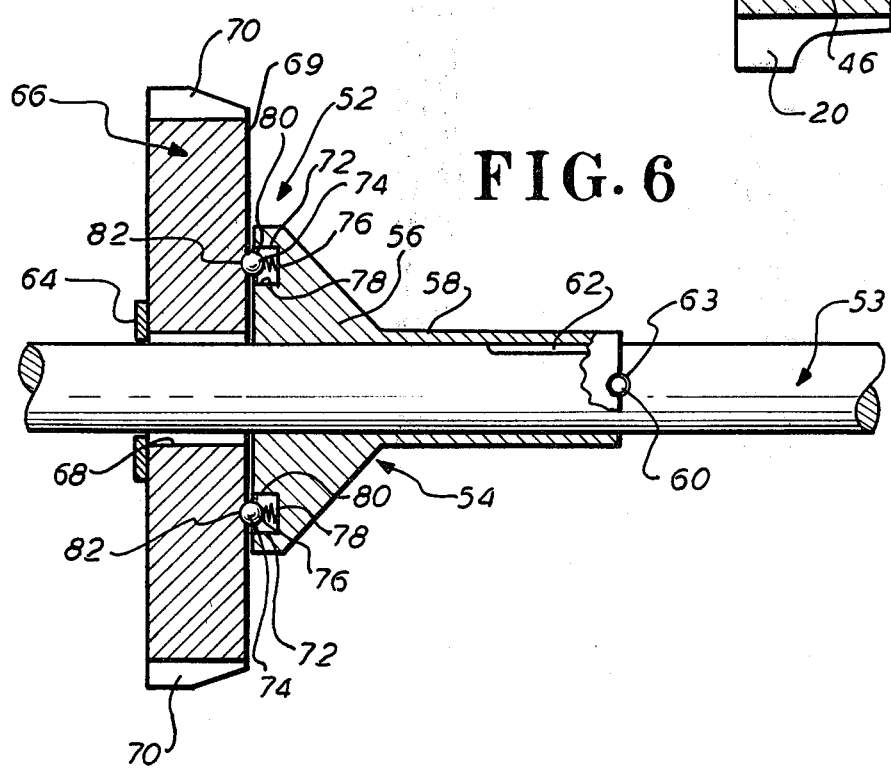

4,411,569

APPARATUS FOR BROACHING RIFLING

GOVERNMENTAL INTEREST

The invention described herein may be manufactured, used and licensed by or for the Government for Governmental purposes without the payment to me of any royalties thereon.

BACKGROUND OF THE INVENTION

The present invention relates generally to firearms employing rifled gun barrels, and particularly to gun barrels in which gain twist rifling is desired.

The provision of gain twist rifling in gun barrels is well known and comprises the alteration of the rifling grooves in pitch at least once along the barrel length, to either, for example, increase or decrease the axial distance between respective grooves.

The prior art techniques for providing gain twist rifling comprised the employment of a series of cutter devices, each defining a progressive increase in the cutting diameter, to gradually cut out the full extent of the rifling grooves. The cutters conventionally defined an essentially circular circumference along which were regularly placed a plurality of cutter elements that were adapted to enter and increase the depth of the rifling groove initially inscribed within the barrel.

The employment of stationary cutters in a regular sequence was conducted by separate operations, wherein each cutter was sequentially passed through the length of the gun barrel. This procedure was extremely time and energy consumptive. Attempts to shorten the procedure by seeking to make cuts of greater incremental diameter were unsatisfactory, as greater resistance offered by the additional metal sought to be removed, required an undesirable increase in the power needed to drive the cutters and also adversely increased tool wear, thereby decreasing tool life.

SUMMARY OF THE INVENTION

The present invention relates to a method for broaching a gain twist rifling in a gun barrel comprising forming a first tracking groove defining the desired variation in groove pitch, and thereafter sequentially performing a plurality of deeper cuts through the tracking groove by passing a plurality of sequentially increased diameter, selectively freely rotatable cutter assemblies in fixed, axially spaced apart relation to each other along a common support and drive shaft. Each cutter assembly rotates freely on the shaft in contact with the tracking groove, and all of the incrementally increasing diameter cuts, up to and including the greatest diameter cut, may be performed in one pass.

The apparatus of the present invention is adapted for selective rotation and contact with a tracking groove disposed within a gun barrel and comprises a rotatable cutter means mounted on an axial support and drive shaft. The cutter means comprises a plurality of cutter assemblies disposed in fixed, spaced apart relation with respect to each other along the support and drive shaft. Each cutter assembly is selectively freely rotatable about the support and drive shaft in contact with the tracking groove, and defines a plurality of radially outwardly projecting cutters that engage and move through the tracking groove. The apparatus includes an indexing assembly to facilitate the alignment of the cutters with the tracking groove.

By means of the present invention, gain twist rifling in gun barrels may be broached in a minimum number of passes, with a corresponding reduction in energy consumption. The apparatus is of simple construction and operation, and may work as an integrated unit in combination with a suitable linear prime mover.

Accordingly, it is a principal object of the present invention to provide a method and apparatus for broaching gain twist rifling grooves within gun barrels.

It is further object of the present invention to provide a method and apparatus as aforesaid which reduces the time and energy requirements necessary to perform said gain twist broaching.

Other objects and advantages will become apparent from a consideration of the detailed description of the invention which proceeds with reference to the following illustrative drawings.

BRIEF DESCRIPTION OF THE DRAWINGS

FIG. 4 is a front view showing one of the cutter assemblies shown in FIG. 2.

FIG. 5 is a side sectional view of the cutter assembly shown in FIG. 4.

FIG. 6 is a side sectional view similar to FIG. 5 showing an alternate embodiment of the present invention.

DETAILED DESCRIPTION OF THE PREFERRED EMBODIMENTS

In accordance with the present invention, a method for broaching a gain twist rifling in a gun barrel may be conducted by first inscribing in the gun barrel the initial tracking groove, carrying the desired rifling pattern. Thereafter, sequentially deeper cuts in the initial tracking groove may be made by passing through the gun barrel a series of incrementally increased diameter cutting assemblies, until the final dimensions and finish of the rifling are achieved. The present method is most notably achieved by use of an apparatus described hereinafter.

Figure 1:
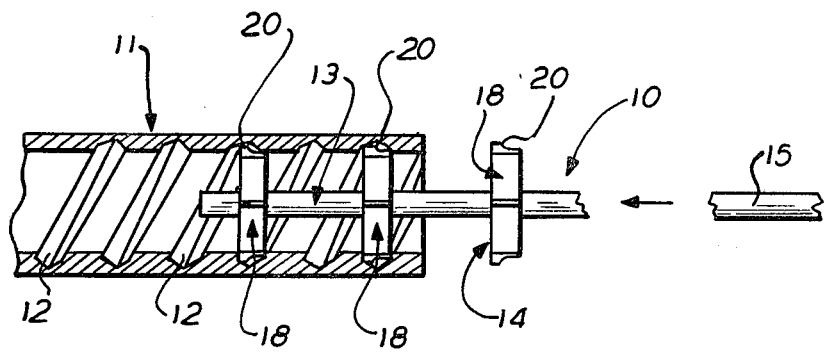
FIG. 1 is a fragmentary side view partly in section showing the apparatus of the invention engaging a gun barrel.
Figure 2:
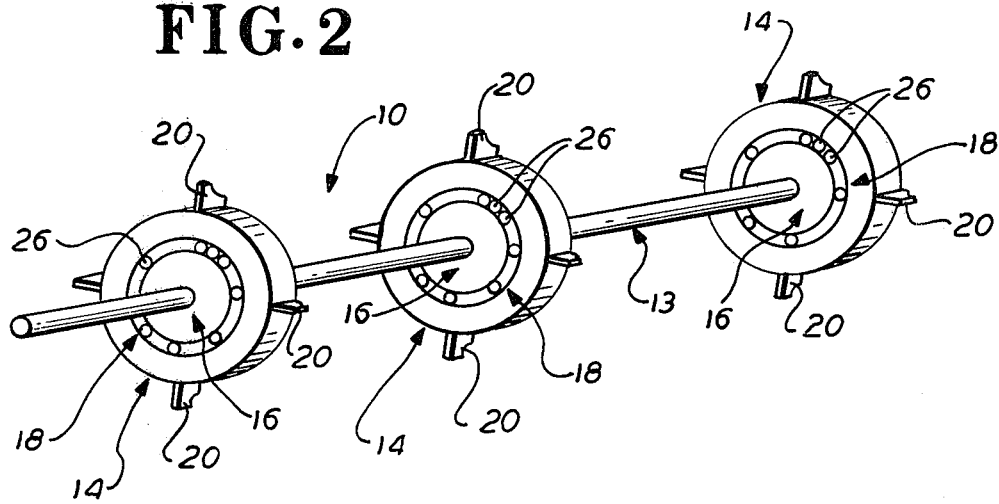
FIG. 2 is a prespective view of the apparatus of FIG. 1.
Figure 3:
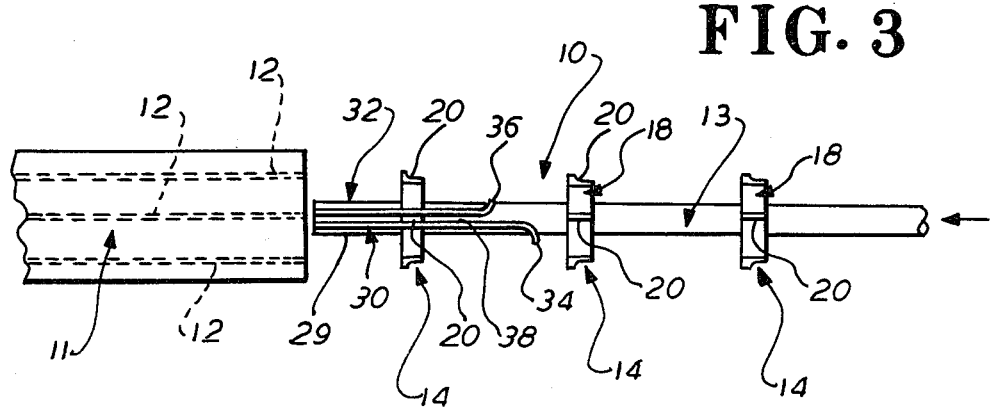
FIG. 3 is a schematic side view showing another feature of the invention.

A broaching apparatus 10 is shown in FIGS. 1 and 2 in conjunction with a representative gun barrel 11 which has been broken to illustrate the gain twist tracking groove 12 that was intially inscribed by conventional means. The term "gain twist" refers to a rifling groove pattern where the grooves alter in pitch at least once. Thus, the pitch of tracking groove 12 adjacent apparatus 10 can be seen to alter, and increases markedly as the tracking groove 12 proceeds away from apparatus 10.

Broaching apparatus 10 shown here fragmentarily comprises a cutter means mounted on a support and drive shaft 13. Apparatus 10 can best be considered a cutting tool, as it must be utilized in conjunction with a prime mover 15 to impart linear motion in the direction of gun barrel 11, as illustrated by the directional arrow. The specific construction of the prime mover 15 is not critical, and may vary within the skill of the art to include a variety of conventional motive means, all known.

The cutter means of apparatus 10 comprises a plurality of cutter assemblies 14, also known as "buttons", that are better shown in perspective in FIG. 2. Cutter assemblies 14 are adapted to freely rotate about support and drive shaft 13, and may, as illustrated in FIGS. 1-5, comprise a central hub 16 fixedly mounted upon support and drive shaft 13, about which a rotatable shell 18 is annularly disposed. A plurality of cutters 20 are mounted on the perimeter of shell 18 and project radially outward therefrom, to engage tracking groove 12, as illustrated in FIG. 1. Though four cutters are illustrated in FIGS. 1 and 2, it is to be understood that the present invention may utilize as many as six or more such cutters 20. Thus, FIG. 4 illustrates a cutter assembly 14 wherein six cutters 20 are utilized. Naturally, the number of cutters 20 utilized is not critical and may vary within the scope of the present invention.

The cutter assembly of the present invention includes a bearing means provided to assist the cutter assembly in its free rotation. In the embodiment illustrated in FIGS. 2, 4 and 5, the bearing means is annularly disposed between the stationary hub 16 and the rotatable shell 18. In this embodiment, the bearing means comprises an inner race 22 defined by a portion of the circumferential perimeter of hub 16, and an outer race 24 defined by a central bore in shell 18 facilitating the rotatable displacement of shell 18 about hub 16. Outer race 24 as illustrated appears as a counter bore defining an annular channel between it and inner race 22, to accommodate a bearing member 26, which is illustrated herein as a plurality of ball bearings. Naturally, the employment of ball bearings as the bearing member is illustrative rather than restrictive, as a variety of bearing members, such as self-lubricating bushings and the like are well known and may be utilized herein.

Cutter assemblies 14 as illustrated are mounted in fixed, spaced apart relation with respect to each other along support and drive shaft 13. Accordingly, a fastening means is employed to secure hub 16 in position, and comprises in the illustration weld connections 28 disposed circumferentially adjacent the junction of hub 16 and support and drive shaft 13. Naturally, the fastening means useful in the present invention are not limited to weld connections, but include releasable means such as those shown in FIG. 6, discussed later on herein.

Apparatus 10 also includes an indexing means to assure that the cutters of the cutting assemblies are in alignment with the tracking grooves when the apparatus is brought into contact with the gun barrel. In one embodiment, illustrated in FIG. 3, each of the cutting assemblies 14 comprises a freely rotatable shell 18 mounted on a corresponding hub 16 as earlier described. In such instance, indexing means may be provided that is disposed adjacent the entry to the gun barrel 11, to guide the incoming cutters 20. Thus, in FIG. 3, indexing means 29 comprises a first longer guide bar 30, and a second shorter guide bar 32, each guide bar defining, respectively, oppositely directed, flared ends 34 and 36, which accept and slidably engage cutter 20 as shown to prevent cutting assembly 14 from rotating until it makes contact with the origins of tracking grooves 12, illustrated herein in phantom. Naturally, though guide bars 30 and 32 are illustrated schematically as disposed adjacent gun barrel 11, it is to be understood that the exact mounting of the guide bars may vary in accordance with the present invention, from a direct detachable attachment to the gun barrel, to disposition on a support structure for the gun barrel, not shown herein.

The indexing means of the present invention may also be associated directly with cutter assemblies 14. Referring to FIG. 5, cutter assembly 14 illustrated therein includes a brake means having a torque-responsive release capability. The brake means is defined by a spring biased projection 40, which in turn comprises a ball 42 positioned under the tension of spring 44 within pocket 46, shown herein as provided within shell 18. Ball 42 is held within pocket 46 by retaining ring 48, and thus projects slightly outward and away from shell 18 toward the circumferential perimeter of hub 16. A detent 50 is defined in the perimeter of hub 16, and is adapted to releasably seat the projecting tip of ball 42. Thus, projection 40 extends between shell 18 and hub 16 to engage detent 50, to hold shell 18 and hub 16 in fixed position to each other. As the illustrated size of projection 40 and detent 50 suggests, the force necessary to overcome the retaining action of this brake means is generally slight, and the torque generated by the rotation of the shell 18 upon the engagement of cutters 20 with tracking groove 12 is generally sufficient.

While projection 40 and corresponding detent 50 are illustrated in radial alignment with cutter 20, such alignment is not necessary. Also, while the brake means may comprise one projection 40 and one corresponding detent 50, the invention includes a plurality of projections 40 and detents 50. The detents 50 should correspond in number to the number of cutters 20 in entering radial alignment with the rifling grooves in the gun barrel.

As noted earlier, the cutter assembly utilized in the apparatus of the present invention may be constructed in an alternate manner, all within the spirit and scope herein. Thus, FIG. 6 illustrates an alternate cutter assembly 52 disposed along a modified support and drive shaft 53, having a hub 54 comprising a plate 56 tapering down to a shank portion 58. Hub 54 is releasably fixed to support and drive shaft 53. The releasable fastening means comprises a keyway 62 disposed within shank 58 that accepts a corresponding ridge disposed on support and drive shaft 53. Also, a pin 60 passing transversely through support and drive shaft 53 engages a corresponding notch 63 disposed at the end of shank 58. A lock washer 64 is provided at the opposite end along shaft 53 to retain hub 54 and shell 66 in position as shown.

Shell 66 has a central bore 68 therein which is rotatably mounted directly upon support and drive shaft 53. An annular space is shown which may contain an annular bushing serving as a bearing means, to promote the free rotation of shell 66 about support and drive shaft 53. Shell 66 is mounted axially adjacent hub 54 so that the adjacent radial surface 69 of shell 66 may communicate with the corresponding surface defined by plate 56. A space preferably exists between these surfaces, however, to permit shell 66 to rotate during the broaching operation. Also, the broad surface of plate 56 lying adjacent radial surface 69 may comprise a planar bushing adapted to slidably engage radial surface 69 in operation. Naturally, the provision of a planar bushing is illustrative rather than restrictive of the present invention.

Cutter assembly 52 is seen to include a brake means similar in construction and operation to that illustrated with respect to cutting assembly 14 in FIG. 5. Thus, a spring biased projection 72 is disposed within plate 56 facing toward radial surface 69, and comprises a ball 74 held under tension by a spring 76, all retained within a pocket 78 and maintained in position by a retainer ring 80. A corresponding detent 82 is provided in radial surface 69, so that when projection 72 seats within detent 82, shell 66 is held in fixed position adjacent hub 54, to permit cutters 70 to be aligned with the tracking grooves 12. The construction of cutter assembly 52, with radial surface 69 closely adjacent the corresponding planar surface of plate 56 is similar in concept and appearance to an axial "slip clutch" arrangement, in that the adjacent surfaces retain a frictional engagement that can be overcome by the torque generated during the broaching operation by the rotation of the cutters 70 within the tracking grooves 12. In this connection, the embodiment illustrated in FIG. 6 may be modified in a manner not specifically shown, to provide a felt pad or the like, in axial position mounted upon the planar surface of plate 56, so as to abut radial surface 69. Such a pad would be employed in place of the projection 72 and corresponding detent 82.

Referring again to FIGS. 5 and 6, it should be apparent that the disposition of the components of the brake means of the present invention is not critical; thus, the spring biased projection may be disposed in either the hub or the shell, and the corresponding detent may be located in the opposite member. Both embodiments are illustrated, respectively, in FIGS. 5 and 6, and the invention is not limited to the specific disposition of the respective elements of the brake means.

The assembly of the present invention is primarily useful in that the broaching of gain twist rifling grooves may be accomplished in a substantially reduced number of passes. As discussed earlier, the broaching operation subsequent to the formation of the initial or tracking groove, comprises the sequential increase and refinement in the size of the groove to form the final rifling groove. Referring again to FIG. 2, the present apparatus accommodates this function by providing a series of cutter assemblies 14 wherein consecutive adjacent cutter assemblies define cutters 20 that extend incrementally radially further outward. The exact increment of increased diameter defined by the incrementally larger cutters 20 may vary in accordance with parameters known in the broaching art, to provide a smooth transition from one cutting assembly to the next, to reduce or minimize the power expenditure necessary to deepen the rifling groove.

OPERATION

As indicated earlier, the method of the present invention comprises the initial inscription of the tracking groove 12 within the gun barrel 11. Thereafter, the apparatus 10 comprising the present cutting tool, may be appropriately mounted on a linear prime mover and placed in axial alignment with the gun barrel.

The cutting tool is then brought toward the gun barrel with the cutters in alignment to directly engage the tracking grooves at their inception at the adjacent opening of the gun barrel. Once engaging the tracking grooves, the cutters proceed to rotate through the grooves to inscribe a deeper cut. Each cutting assembly moves sequentially through the gun barrel, inscribing its incrementally deeper cut in the tracking groove, until the last cutting assembly passes therethrough, and the broaching operation is complete. Thus, the broaching method in accordance with the present invention may be conducted in one pass to achieve with minimal power output a final rifling groove.

The cutting tool of the present invention is intended for use with gun barrels, all of which are fashioned from metal. Accordingly, the cutting assemblies may be prepared from materials well-known for their strength and durability in cutting operations. For example, the cutting assemblies may be prepared from a variety of suitable metals, including iron, brass and steel. The cutters are typically prepared from tungsten carbide, which may be soldered to the shell with a silver containing soldering or brazing composition. In the instance where a bushing is utilized as part of the assembly, as proposed with respect to the embodiment of FIG. 6, the surface of plate 56 adjacent radial surface 69 may be prepared from a sintered iron or brass that has been impregnated with graphite. Naturally, the exact materials and methods of manufacture are not critical, and may vary within the scope of the invention.

As noted earlier, the apparatus as illustrated in FIGS. 2 and 3 displays three cutting assemblies 14. As noted earlier, these cutting assemblies may be arranged in order of increasing diameter or radial most extension of the cutters 20, to gradually deepen the rifling grooves. The exact number and placement of cutting assemblies 14 along support and drive shaft 13 may likewise vary in accordance with the specific grooving operation to be conducted, and the invention is accordingly not limited to the apparatus shown and described herein.

The foregoing disclosure and drawings are merely illustrative of the principles of this invention and are not to be interpreted in a limiting sense. I wish it to be understood that I do not desire to be limited to the exact details of construction shown and described, for obvious modifications will occur to a person skilled in the art, and such modifications are to be considered within the scope of the invention.

What is claimed is:

1. A tool for use with a linear prime mover for broaching a gain twist rifling groove in a gun barrel comprising:

a support and drive shaft attachable to said prime mover;

a plurality of cutter assemblies mounted in spaced apart fixed position along said support and drive shaft, and adapted to rotate freely thereabout which includes;

a hub mounted in fixed position on said support and drive shaft;

a shell rotatably mounted on said support and drive shaft axially adjacent said hub;

bearing means located between said shell and said support and drive shaft; wherein said cutters are mounted on said shell and project radially therefrom;

a plurality of cutters projecting radially from each of said cutter assemblies, and adapted for cutting engagement with the rifling groove inscribed in said gun barrel; and indexing means for aligning said cutters with said rifling groove which includes;

parallel disposed guide bars positioned adjacent said gun barrel, said guide bars defining a slot to receive one of said cutters, and to permit the cutter to slide therethrough into aligned contact with said rifling groove when said tool is brought into position therewith.

2. The tool of claim 1 wherein said indexing means comprises at least one brake means associated with each of said cutter assemblies to selectively prevent said cutter assemblies from rotating freely on said support and drive shaft.

3. The tool of claim 2 which includes a brake means located between said hub and said shell, for retaining said hub and said shell in fixed position to each other, said brake means adapted to release in response to the application of a predetermined amount of torque upon said shell.

4. The tool of claim 3 wherein said brake means comprises at least one spring biased projection and at least one corresponding detent, said projection extending between said hub and said shell to removably seat within said detent.

5. The tool of claim 4 wherein said projection and said detent are adapted for radial alignment with one of said cutters.

6. The tool of claim 4 wherein a plurality of projections and corresponding detents are provided, corresponding in number with said cutters.

* * * * *